(12) United States Patent
Kanitz

(10) Patent No.: US 11,964,403 B2
(45) Date of Patent: Apr. 23, 2024

(54) AUTOMATED CLEANING SYSTEMS FOR AUTONOMOUS VEHICLES

(71) Applicant: UATC, LLC, Mountain View, CA (US)

(72) Inventor: Daniel Adam Kanitz, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 170 days.

(21) Appl. No.: 17/574,897

(22) Filed: Jan. 13, 2022

(65) Prior Publication Data

US 2022/0134573 A1    May 5, 2022

Related U.S. Application Data

(63) Continuation of application No. 16/037,610, filed on Jul. 17, 2018, now Pat. No. 11,235,471.

(Continued)

(51) Int. Cl.
| | |
|---|---|
| *B25J 9/16* | (2006.01) |
| *A47L 5/38* | (2006.01) |
| *A47L 7/00* | (2006.01) |
| *A47L 9/28* | (2006.01) |
| *B25J 11/00* | (2006.01) |
| *B60S 1/64* | (2006.01) |
| *G05D 1/02* | (2020.01) |
| *G05D 1/00* | (2006.01) |

(52) U.S. Cl.
CPC ............... *B25J 9/1697* (2013.01); *A47L 5/38* (2013.01); *A47L 7/0076* (2013.01); *A47L 9/2852* (2013.01); *B25J 11/0085* (2013.01); *B60S 1/64* (2013.01); *A47L 2201/04* (2013.01); *G05D 1/021* (2013.01); *G05D 2201/0213* (2013.01)

(58) Field of Classification Search
CPC ...... A47L 2201/04; A47L 5/38; A47L 7/0076; A47L 9/2852; B25J 11/0085; B25J 15/0206; B25J 19/023; B25J 9/1697; B60S 1/64; G05D 1/00; G05D 1/021; G05D 2201/0213
See application file for complete search history.

(56) References Cited

U.S. PATENT DOCUMENTS

| 3,449,787 A | 6/1969 | Rothstein et al. |
| 5,189,753 A | 3/1993 | Sousa et al. |

(Continued)

FOREIGN PATENT DOCUMENTS

| DE | 102011010205 | 10/2011 | | |
| DE | 102011010205 A1 * | 10/2011 | ............ | B60S 3/008 |

(Continued)

*Primary Examiner* — Marc Carlson
(74) *Attorney, Agent, or Firm* — Dority & Manning, P.A.

(57) ABSTRACT

Systems and methods are directed to automated cleaning systems for vehicles. In one example, a vehicle is provided that includes a drive system, a passenger cabin, and a vehicle cleaning system. The vehicle cleaning system includes a vacuum unit and a robotic manipulator. The robotic manipulator includes an arm including a plurality of arm sections and a gripper unit positioned at a distal end of the arm. The robotic manipulator is connected to the vacuum unit such that the arm provides a vacuum path between the vacuum unit and the gripper unit.

20 Claims, 11 Drawing Sheets

Related U.S. Application Data

(60) Provisional application No. 62/674,670, filed on May 22, 2018.

(56) References Cited

U.S. PATENT DOCUMENTS

| | | | |
|---|---|---|---|
| 5,829,091 A | 11/1998 | Ingram et al. | |
| 6,148,472 A | 11/2000 | Arena | |
| 7,266,859 B2 | 9/2007 | Stone | |
| 2002/0121291 A1* | 9/2002 | Daum | B60S 3/008 134/123 |
| 2003/0140443 A1* | 7/2003 | Najm | A47L 5/38 15/313 |
| 2004/0134013 A1* | 7/2004 | Slone | B60S 1/64 15/313 |
| 2016/0368461 A1* | 12/2016 | Logli, Jr. | B60S 1/64 |
| 2017/0297537 A1* | 10/2017 | Yako | A61L 2/22 |
| 2018/0029219 A1* | 2/2018 | Piccioni | B25J 11/0025 |
| 2019/0168396 A1* | 6/2019 | Leidenfrost | B25J 9/1697 |
| 2019/0208972 A1* | 7/2019 | Yurko | B01D 46/522 |
| 2019/0316369 A1* | 10/2019 | Pivac | B25J 19/022 |
| 2019/0358818 A1* | 11/2019 | Kanitz | B60S 1/64 |
| 2019/0362295 A1* | 11/2019 | Kanitz | B60S 1/64 |
| 2020/0350850 A1* | 11/2020 | Di Stefano | B25J 9/1687 |

FOREIGN PATENT DOCUMENTS

| | | | | |
|---|---|---|---|---|
| WO | WO 2017031030 | | 2/2017 | |
| WO | WO-2017031030 A1 * | | 2/2017 | A47L 5/38 |

* cited by examiner

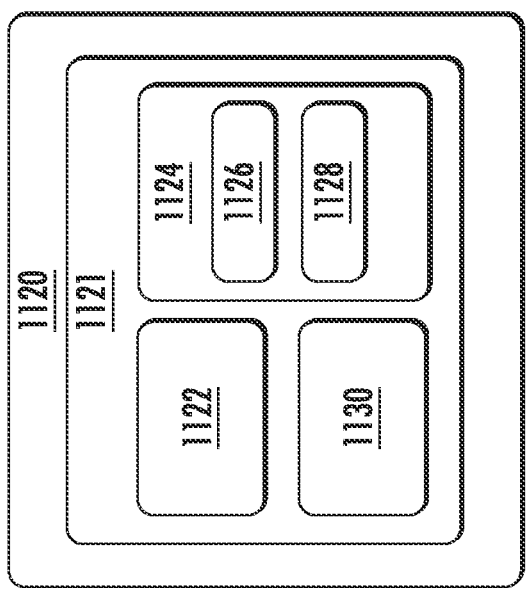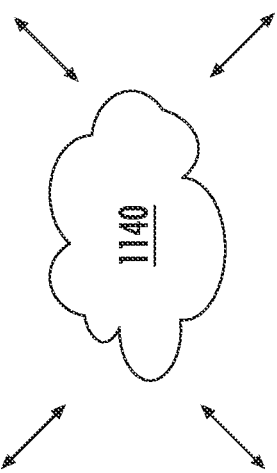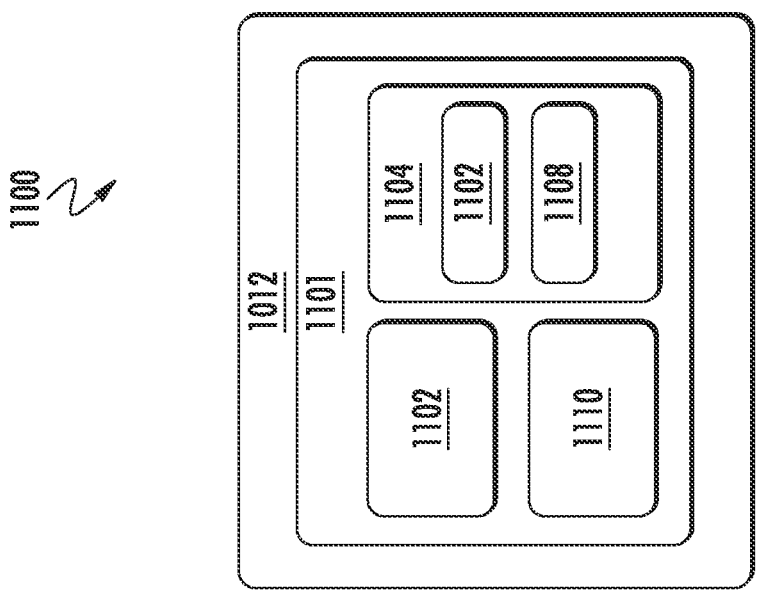
FIG. 11

AUTOMATED CLEANING SYSTEMS FOR AUTONOMOUS VEHICLES

The present application is based on and claims the benefit of U.S. Non-Provisional patent application Ser. No. 16/037,610 having a filing date of Jul. 17, 2018, which claims the benefit of priority of U.S. Provisional Application 62/674,670 having a filing date of May 22, 2018, which are hereby incorporated by reference herein in their entirety for all purposes.

FIELD

The present disclosure relates generally to cleaning systems. More particularly, the present disclosure relates to systems and methods that provide for automated cleaning of vehicles.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. This can allow an autonomous vehicle to navigate without human intervention and, in some cases, even omit the use of a human driver altogether.

When a vehicle is operated in a fully autonomous mode, there may not be a human driver present to monitor the state of the interior of the vehicle. For example, in a non-autonomous vehicle, a driver can determine if objects are left behind in the vehicle and can monitor when the vehicle interior needs to be cleaned to provide a desired standard of service to users. Without a human driver present in the vehicle, an autonomous vehicle may need to be taken out of service periodically to inspect the cleanliness of the vehicle interior and perform any necessary action to return the vehicle interior to the desired standard.

SUMMARY

Aspects and advantages of embodiments of the present disclosure will be set forth in part in the following description, or can be learned from the description, or can be learned through practice of the embodiments.

One example aspect of the present disclosure is directed to a vehicle. The vehicle includes a drive system, a passenger cabin, and a vehicle cleaning system. The vehicle cleaning system includes a vacuum unit and a robotic manipulator. The robotic manipulator includes an arm including a plurality of arm sections and a gripper unit positioned at a distal end of the arm. The robotic manipulator is connected to the vacuum unit such that the arm provides a vacuum path between the vacuum unit and the gripper unit.

Another example aspect of the present disclosure is directed to a vehicle cleaning system. The vehicle cleaning system includes a vacuum unit and a robotic manipulator. The robotic manipulator includes an arm including a plurality of arm sections and a gripper unit positioned at a distal end of the arm. The robotic manipulator is connected to the vacuum unit such that the arm provides a vacuum path between the vacuum unit and the gripper unit.

Another example aspect of the present disclosure is directed to a computer-implemented method for interior vehicle cleaning. The method includes obtaining, by a computing system comprising one or more computing devices, sensor data associated with an interior cleanliness state of a vehicle. The method further includes identifying, by the computing system, if an interior area or surface of the vehicle deviates from a defined standard based at least in part on the sensor data. The method further includes, in response to identifying an interior area or surface of the vehicle that deviates from a defined standard, obtaining, by the computing system, one or more motion paths for a robotic manipulator, wherein the one or more motion paths provide for operating the robotic manipulator to clean the identified interior area or surface of the vehicle. The method further includes providing, by the computing system, one or more control signals to operate the robotic manipulator to clean the interior area or surface of the vehicle interior surface based on the one or more motion paths.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 11 depicts a block diagram of an example computing system according to example embodiments of the present disclosure.

DETAILED DESCRIPTION

Figure 1:
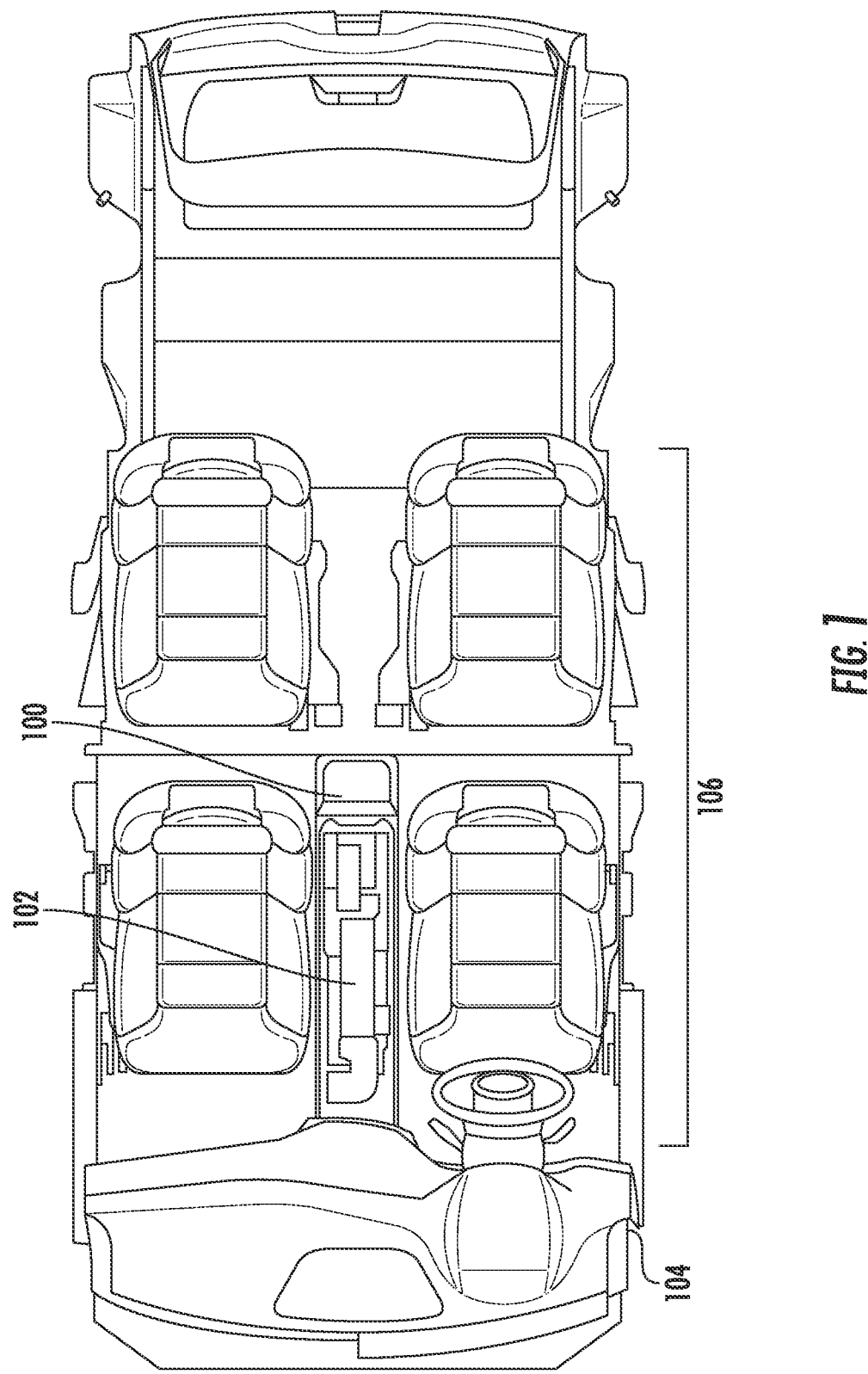
FIG. 1 depicts an example of an automated cleaning system integrated in a vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to automated cleaning systems for vehicles. In particular, the systems and methods of the present disclosure can allow for automated cleaning of vehicles, such as autonomous vehicles, on an ongoing basis to provide for a clean and pleasant trip for each user of a vehicle. The systems and methods of the present disclosure can facilitate determining when a vehicle interior deviates from an established standard (e.g., no refuse, debris, etc. within the vehicle passenger cabin, etc.) or when objects have been left behind in the vehicle and allow for the collection of objects, cleaning and/or sanitizing of interior surfaces, and/or the like, for example, through the use of a robotic manipulator integrated within the interior of the vehicle. The systems and methods of the present disclosure can allow for cleaning a vehicle after each service trip thereby ensuring that each user is presented with a vehicle interior that meets a desired standard for cleanliness.

When a vehicle is operated in a fully autonomous mode, there may not be a human driver present to monitor the state of the interior of the vehicle. For example, in a non-autonomous vehicle, a driver can determine if objects are left behind in the vehicle and can monitor when the vehicle interior needs to be cleaned to provide a desired standard of service to users. Without a human driver present in the vehicle, an autonomous vehicle may need to be taken out of service periodically to inspect the cleanliness of the vehicle interior and perform any necessary action to return the vehicle interior to the desired standard. Additionally, with an autonomous vehicle, passenger or user behavior may change without the presence of a human driver, such that objects may be left behind in the vehicle by the users at the end of a service trip. The systems and methods of the present disclosure can mitigate these issues by providing an automated cleaning system integrated into the vehicle that can inspect the interior and take any necessary or desired actions to maintain the cleanliness of the vehicle interior after each service trip.

More particularly, an entity (e.g., service provider, owner, manager) can use one or more vehicles (e.g., ground-based vehicles) to provide a vehicle service, such as a transportation service (e.g., rideshare service), a courier service, a delivery service, etc. The vehicles can comprise a drive system at least including an engine/transmission/axle assembly for transferring torque to the wheels for driving the vehicle. The vehicle(s) can be an autonomous vehicle(s) that includes various systems and devices configured to control the operation of the vehicle(s). For example, an autonomous vehicle can include an onboard vehicle computing system for operating the vehicle (e.g., located on or within the autonomous vehicle). The vehicle computing system can receive sensor data from a sensor(s) onboard the vehicle (e.g., cameras, LIDAR, RADAR), attempt to comprehend the vehicle's surrounding environment by performing various processing techniques on the sensor data, and generate an appropriate motion plan through the vehicle's surrounding environment. The vehicle computing system can control (e.g., via a vehicle controller, etc.) one or more vehicle controls (e.g., actuators or other devices that control acceleration, throttle, steering, braking, etc.) to execute the motion plan. Moreover, the autonomous vehicle can be configured to communicate with one or more computing devices that are remote from the vehicle. For example, the autonomous vehicle can communicate with an operations computing system that can be associated with the entity. The operations computing system can help the entity monitor, communicate with, manage, etc. the fleet of vehicles.

According to an aspect of the present disclosure, an automated cleaning system can comprise a robotic manipulator integrated into a vehicle that can perform routine cleaning of the vehicle interior. In some implementations, the robotic manipulator can include a robotic arm comprised of multiple arm segments and rotary joints to allow the robotic manipulator to access all of the surfaces and/or areas within the vehicle interior that may need to be cleaned, for example, after a service trip is completed. For example, in some implementations, the robotic manipulator can be configured with a plurality of adjacent arm segments and joints based on the location of the robotic manipulator within the vehicle to provide desired degrees of freedom (e.g., five degrees of freedom, seven degrees of freedom, etc.) to allow the robotic manipulator access to all the areas and/or surfaces to be cleaned. The robotic manipulator can be configured to identify and collect user objects (e.g., personal/other items left in the vehicle by a user), to collect and remove refuse objects (e.g., trash, other objects) left in the vehicle, and to clean areas and/or surfaces of the vehicle interior, including vacuuming debris and/or sanitizing the areas and/or surfaces. In some implementations, the robotic manipulator can be further configured to manipulate components of the vehicle, such as closing compartments, doors, and/or the like.

In one implementation, the multiple adjacent arm segments and joints of the arm of the robotic manipulator can have a hollow configuration, such as by defining one or more cavities, channels, etc., to provide for routing a vacuum path through the arm of the robotic manipulator, as well as providing separate power and/or data cable paths through the arm. For instance, the arm segments/joints may define a hollow vacuum channel for providing a vacuum path through the arm and one or more additional hollow channels for routing power cables, data cables, and/or the like through the arm. The robotic manipulator can further comprise a gripper unit disposed at a distal end of the arm that can be configured to collet user objects and refuse objects as well as provide a vacuum nozzle for the cleaning system (e.g., in flow communication with the vacuum path through the arm). In some implementations, the gripper unit can further comprise a means for sanitizing and/or sterilizing areas of the vehicle interior, such as through the use of ultraviolet light.

In some implementations, the robotic manipulator can include one or more sensors, such as a camera, etc., that can be used to inspect the vehicle interior and identify objects left behind (e.g., user objects, refuse objects, etc.) and/or surfaces/areas that need to be cleaned.

According to an aspect of the present disclosure, the automated cleaning system can operate in a largely autonomous mode, for example, by performing one or more defined cleaning routines within fixed areas of the vehicle interior. In some implementations, the automated cleaning system can highlight an area to be cleaned and obtain and execute a motion path to perform the cleaning of that area. For example, in some implementations, one or more sensors can be used to inspect each area of the vehicle interior to identify if any objects were left in the vehicle (e.g., user objects, refuse objects, etc.) and/or if the area needs to be cleaned (e.g., vacuumed and/or sanitized, etc.). The automated cleaning system can then implement an appropriate motion path to allow the robotic manipulator to access the designated area and perform the necessary actions. In some implementations, the automated cleaning system can determine and/or receive an indication that a service trip has been completed (e.g., passengers have exited the vehicle at the destination, etc.) and the automated cleaning system can then initiate a defined cleaning routine (e.g., for the interior of the passenger cabin, etc.).

As an example, in some implementations, the one or more sensors (e.g., camera, etc.) can be used to identify personal objects (e.g., user objects) that may have been left behind in the vehicle by a user. The robotic manipulator can be used to collect the object(s) (e.g., using the gripper end) and deposit the object into a collection receptacle within the vehicle where it can be stored until it can be returned to the user. For example, one or more collection receptacles provided in a vehicle can be configured for the storage of user objects and the robotic manipulator can deposit a user object(s) collected after a trip (e.g., user device, bag, wallet, book, papers, etc.) into one of the collection receptacles configured to store user objects such that the user object(s) can be securely stored until the user object(s) can be returned to or retrieved by the user. Additionally, in some implementations, the robotic manipulator can be further configured to provide for handling objects within the vehicle (e.g., objects (e.g., packages, etc.) to be delivered to a recipient external to the vehicle, recovered user objects to be returned to a prior passenger, etc.) and extending outside the vehicle to allow a recipient external to the vehicle to retrieve the object.

In another example, the automated cleaning system can identify larger debris (e.g., refuse objects such as containers, papers, etc.) left in the vehicle and deploy the robotic manipulator to collect the larger debris and deposit the debris into a collection receptacle within the vehicle configured for storage of refuse, for example, to be held for removal during a vehicle service. Additionally, in some implementations, the automated cleaning system can be configured to allow the robotic manipulator to collect larger debris and deposit the debris at a location external to the vehicle (e.g., a refuse container at the roadside, a collection point at a service location, etc.).

According to an aspect of the present disclosure, the robotic manipulator of the automated cleaning system can be centrally located within the vehicle to provide optimal coverage of the vehicle interior. In addition, the robotic manipulator of the automated cleaning system can be integrated into a vehicle such that is does not take up passenger interior space within the vehicle. For example, in some implementations, the robotic manipulator can be centrally located in the vehicle interior and integrated in the floor of the vehicle (e.g., between the front seats, etc.). The robotic manipulator can then be deployed and rotated from this central location to access all the areas within the vehicle interior that may need to be cleaned. In some implementations, the robotic manipulator can be configured such that the robotic manipulator is covered and secured when stowed so that it is isolated from passengers/users within the vehicle.

Alternatively, in some implementations, the robotic manipulator can be located and deployed from behind the rear seats of the vehicle to maximize passenger space with the vehicle.

According to another aspect of the present disclosure, in some implementations, the robotic manipulator can be centrally located in the vehicle interior and integrated in the rooftop of the vehicle. For example, in some implementations, the robotic manipulator can be integrated within a central cavity of a rooftop delivery system and be deployed from the ceiling of the vehicle interior. The central cavity of the rooftop delivery system can be configured such that the cavity is covered and secured when the robotic manipulator is stowed, such that it is isolated from riders within the vehicle.

The systems and methods described herein provide a number of technical effects and benefits. For instance, the systems and methods described herein can provide for an automated vehicle cleaning system that can operate in a largely autonomous manner, thereby allowing the vehicle to be routinely cleaned after service trips to maintain a desired standard of interior cleanliness. Additionally, the systems and methods described herein provide the benefit of reducing the need to take the vehicle out of service for extended periods to clean the vehicle interior, such as requiring the vehicle to return to a service area to be cleaned. The systems and methods described herein can also provide the benefit of enabling personal objects left in the vehicle by a user to be collected and safely stored without needing to take the vehicle out of service to retrieve the object or risk the object being removed by another user.

With reference to the figures, example embodiments of the present disclosure will be discussed in further detail.

FIG. 1 depicts an example of an automated cleaning system 100 integrated within a vehicle 104 according to example embodiments of the present disclosure. As illustrated in FIG. 1, an automated cleaning system 100 can be integrated within a vehicle 104 to provide for automated cleaning of the vehicle (e.g., passenger cabin 106, etc.) on an ongoing basis to provide for a clean and pleasant trip for each user of a vehicle. The automated cleaning system 100 can facilitate determining when a vehicle interior (e.g., passenger cabin 106, etc.) deviates from an established standard or when objects (e.g., user objects, refuse objects, etc.) have been left behind in the vehicle 104 and allow for collection of the objects, cleaning and/or sanitizing of interior areas/surfaces, and/or the like. The automated cleaning system 100 can comprise a robotic manipulator 102 that can be integrated into the vehicle 104 such that is does not take up passenger interior space within the vehicle 104. For example, as illustrated in FIG. 1, the robotic manipulator 102 can be centrally located in the vehicle interior and integrated in the floor of the vehicle 104 between the front seats. The robotic manipulator 102 can then be deployed and rotated from this central location to access all the areas within the vehicle interior (e.g., passenger cabin 106, etc.) that may need to be cleaned. In some implementations, the robotic manipulator 102 can be configured such that the robotic manipulator 102 is covered and secured when stowed so that it is isolated from passengers/users within the vehicle 104.

Figure 2A:
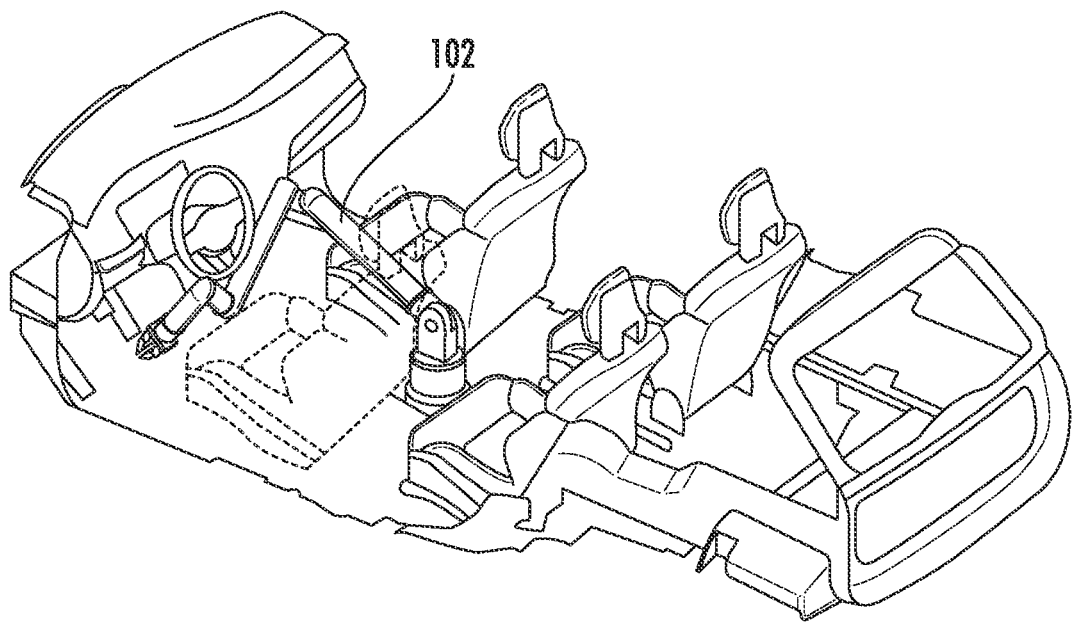
FIGS. 2A-2B depict examples of an automated cleaning system being deployed according to example embodiments of the present disclosure.
Figure 2B:
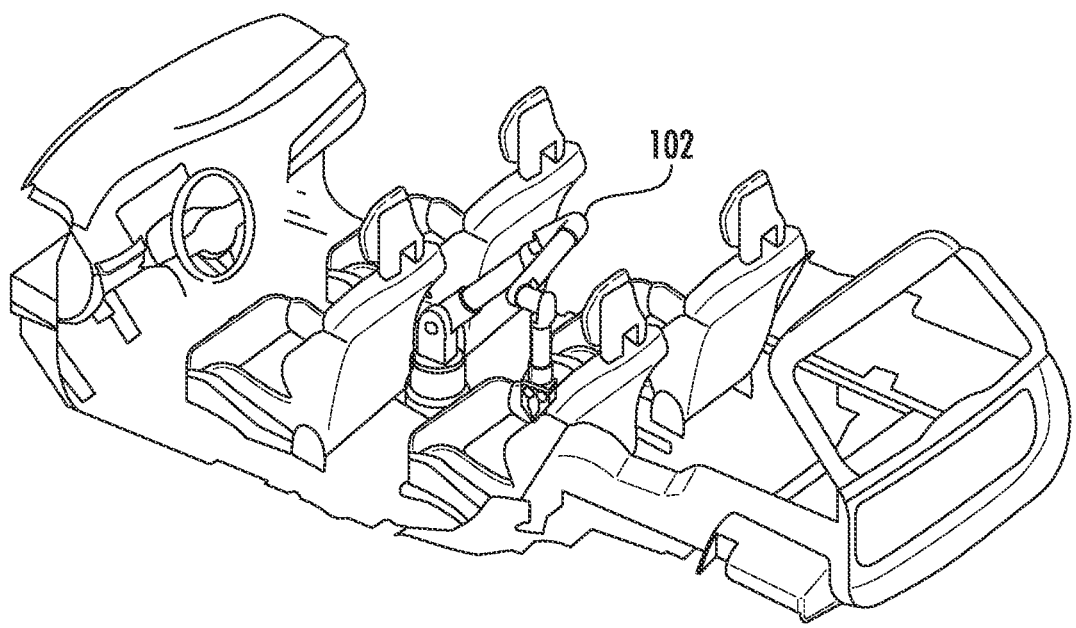

FIGS. 2A-2B depict examples of an automated cleaning system 100 with the robotic manipulator 102 being deployed according to example embodiments of the present disclosure. As illustrated in FIG. 2A and FIG. 2B, the robotic manipulator 102 can be centrally located in the vehicle interior (e.g., between the passenger seats). The robotic manipulator 102 can then be deployed and rotated from this central location to access all the areas within the vehicle interior that may need to be cleaned and/or from which an object may need to be collected.

In some implementations, the automated cleaning system can operate in a largely autonomous mode, for example, by performing one or more preset cleaning routines within fixed areas of the vehicle interior (e.g., after a service trip has been completed, etc.). In some implementations, the automated cleaning system can identify an area to be cleaned and obtain and execute a motion path to perform the cleaning of that area. For example, in some implementations, one or more sensors can be used to inspect each area of the vehicle interior to identify if any objects were left in the vehicle or if the area needs to be cleaned (e.g., vacuumed and/or sanitized, etc.). The automated cleaning system can then implement an appropriate motion path to allow the robotic manipulator to access the designated area and perform the necessary actions.

As an example, as illustrated in FIG. 2A, the robotic manipulator 102 can be deployed from its stowed central location (e.g., after a service trip has been completed and passengers have exited the vehicle, etc.) and perform cleaning of the front areas of the vehicle (e.g., floor, front passenger seats, etc.) by rotating, moving, and extending the arm of the robotic manipulator to reach and clean the designated areas (e.g., according to a defined motion path, based on a determination that an area needs to be cleaned, etc.). Further, as illustrated in FIG. 2B, the robotic manipulator 102 can perform cleaning of the rear front areas of the vehicle (e.g., floor, rear passenger seats, etc.) by rotating, moving, and extending the arm of the robotic manipulator to reach and clean the designated areas (e.g., according to a defined motion path, based on a determination that an area needs to be cleaned, etc.).

Figure 3:
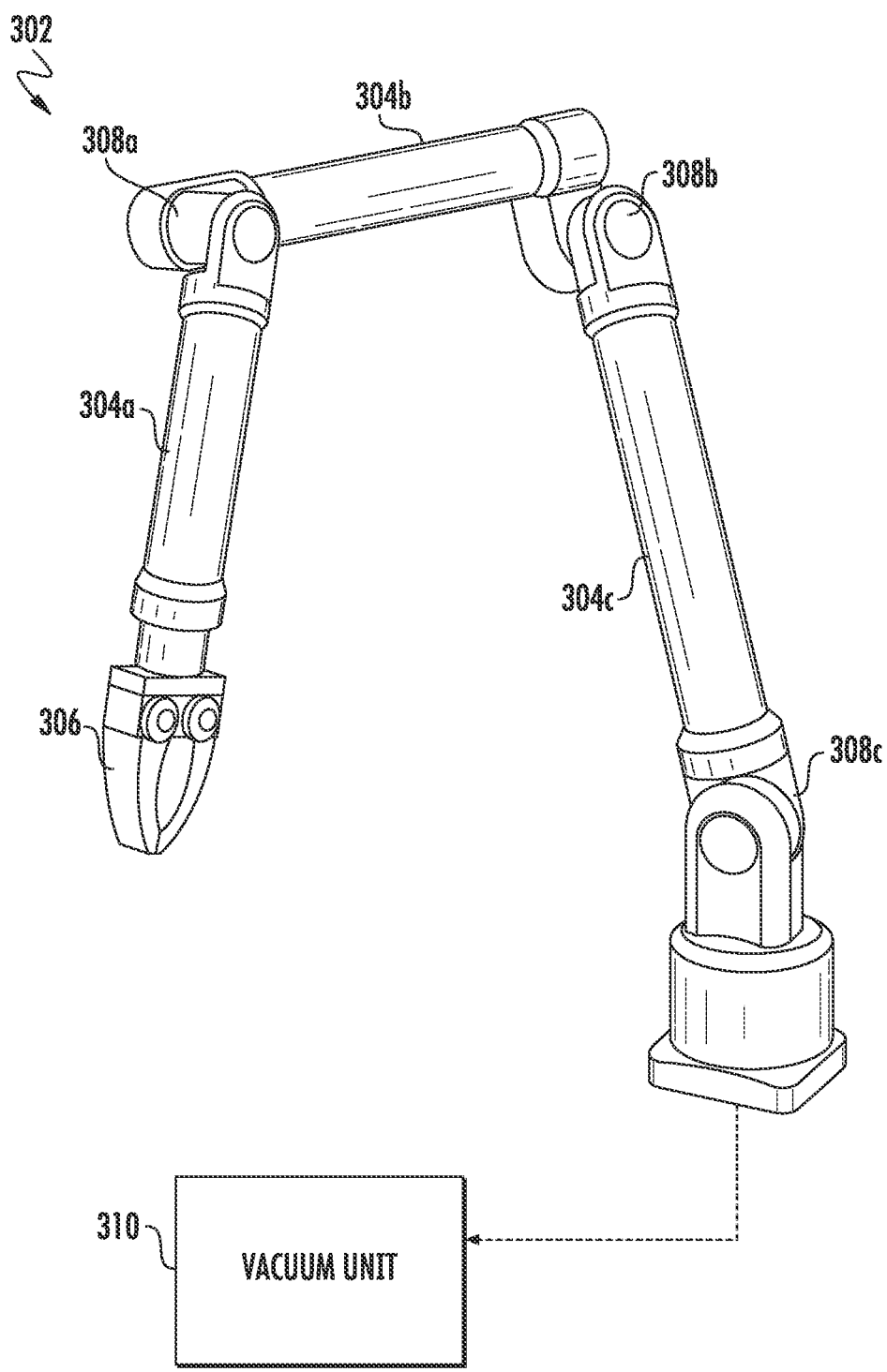
FIG. 3 depicts a robotic manipulator for an automated cleaning system according to example embodiments of the present disclosure.

FIG. 3 depicts a robotic manipulator 302 for an automated cleaning system according to example embodiments of the present disclosure. As illustrated in FIG. 3, a robotic manipulator 302 associated with an automated cleaning system, as described herein, can include a robotic arm comprised of multiple adjacent arm segments 304a-304c and rotary joints 308a-308c that provide relative movement between the multiple adjacent arm segments 304a-304c to allow the robotic manipulator to access all of the surfaces and/or areas within a vehicle interior that may need to be cleaned, for example, after a service trip is completed. In some implementations, the robotic manipulator 302 can be configured with a plurality of adjacent arm segments 304a-304c and joints 308a-308c based on the location of the robotic manipulator 302 within a vehicle to provide desired degrees of freedom (e.g., five degrees of freedom, seven degrees of freedom, etc.) to allow the robotic manipulator 302 access to all the areas and/or surfaces to be cleaned once deployed from a stowed position. The robotic manipulator 302 can further comprise a gripper unit 306 disposed at a distal end of the arm that can be configured to collet objects and/or trash as well as provide a vacuum nozzle for the automated cleaning system. For example, the robotic manipulator 302 can be connected to a vacuum unit 310 to provide for collecting small debris via a vacuum nozzle comprised in the gripper unit 306 (e.g., in flow communication with the vacuum unit 310 via a vacuum path through the arm).

The robotic manipulator 302 can be configured to assist in identifying objects left in a vehicle by a user (e.g., user objects, refuse objects, etc.), to collect left user objects and/or refuse objects, and to clean areas of the vehicle interior, including vacuuming debris and/or sanitizing the surfaces. In some implementations, the robotic manipulator 302 can be further configured to manipulate components of the vehicle, such as closing compartments, doors, and/or the like.

Figure 4:
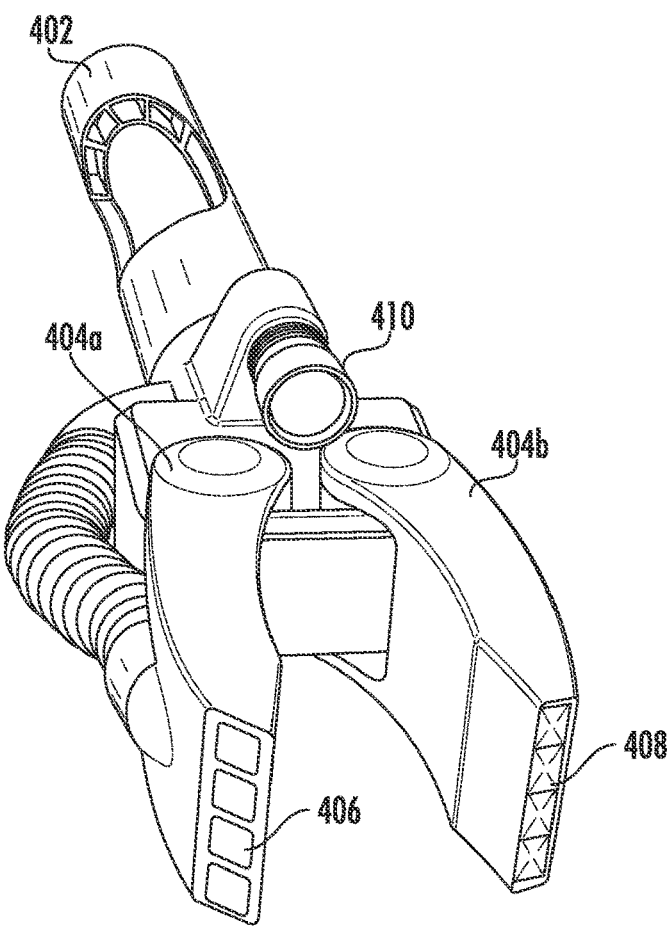
FIG. 4 depicts a gripper end of a robotic manipulator according to example embodiments of the present disclosure.

FIG. 4 depicts a gripper unit 400 of a robotic manipulator according to example embodiments of the present disclosure. As illustrated in FIG. 4, a robotic manipulator of an automated cleaning system (e.g., robotic manipulator 102, robotic manipulator 302, etc.) can comprise a gripper end 400 disposed at a distal end of the robotic manipulator arm 402 that can be configured to collect objects and trash as well as provide a vacuum nozzle 406 for the cleaning system. The gripper unit 400 can comprise a first portion 404a and a second portion 404b that can be configured to grasp objects (e.g., trash, passenger items left in a vehicle, etc.) and provide for depositing the objects into one or more collection receptacles. The end of the first portion 404a of the gripper unit 400 provides a vacuum nozzle 406 that can be configured to be in flow communication with a vacuum unit via a vacuum path through the arm of the robotic manipulator for the cleaning system to collect small debris. The gripper unit 400 further comprises a sanitizing unit 408 located at the end of the second portion 404b of the gripper unit 400, that can provide for sanitizing and/or sterilizing surfaces of the vehicle interior, such as through the use of ultraviolet light.

The robotic manipulator can include one or more sensors 410, such as a camera, etc., associated with the gripper unit 400 that can be used to assist in inspecting the vehicle interior and identifying objects left behind (e.g., user objects, refuse objects, etc.) and/or areas/surfaces that need to be cleaned, used in controlling motion of the robotic manipulator and/or the gripper unit 400, and/or the like. As an example, in some implementations, the one or more sensors 410 (e.g., camera, etc.) can assist in identifying user objects and/or refuse objects that may have been left behind in the vehicle by a user. The robotic manipulator can be used to collect the object (e.g., using the gripper end 400) and deposit the object into a collection receptacle configured within the vehicle where it can be stored until it can be returned to the user and/or discarded, as appropriate. In some implementations, a vehicle can be configured with multiple collection receptacles and each of the collection receptacles can be configured for a specific purpose, such as the storage of user objects, the storage of refuse objects, and/or the like.

Figure 5:
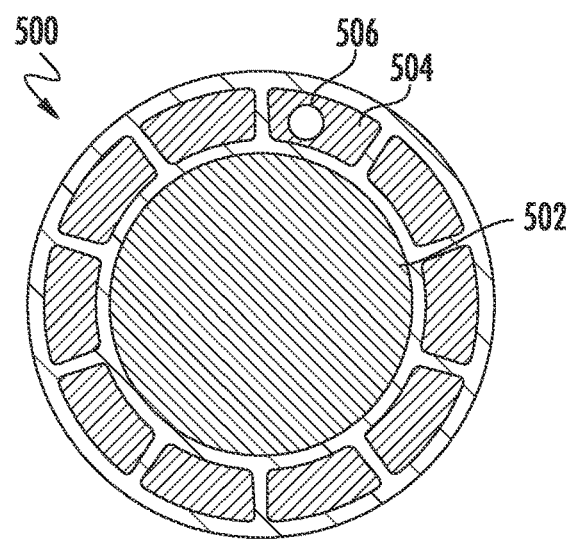
FIG. 5 depicts a cross section of the arm of a robotic manipulator according to example embodiments of the present disclosure.

FIG. 5 depicts a cross section 500 of the arm of a robotic manipulator according to example embodiments of the present disclosure. As illustrated in FIG. 5, the multiple adjacent arm segments and joints of the arm of the robotic manipulator can have a hollow configuration, such as by defining one or more cavities, channels, etc., to provide for routing a vacuum path through the arm of the robotic manipulator, as well as separate power and/or data cable paths through the arm. For instance, the arm segments/joints may define a hollow vacuum channel 502 for providing a vacuum path through the arm and one or more additional hollow channels 504 for routing cables (e.g., cable 506, etc.) and/or the like through the arm.

Figure 6:
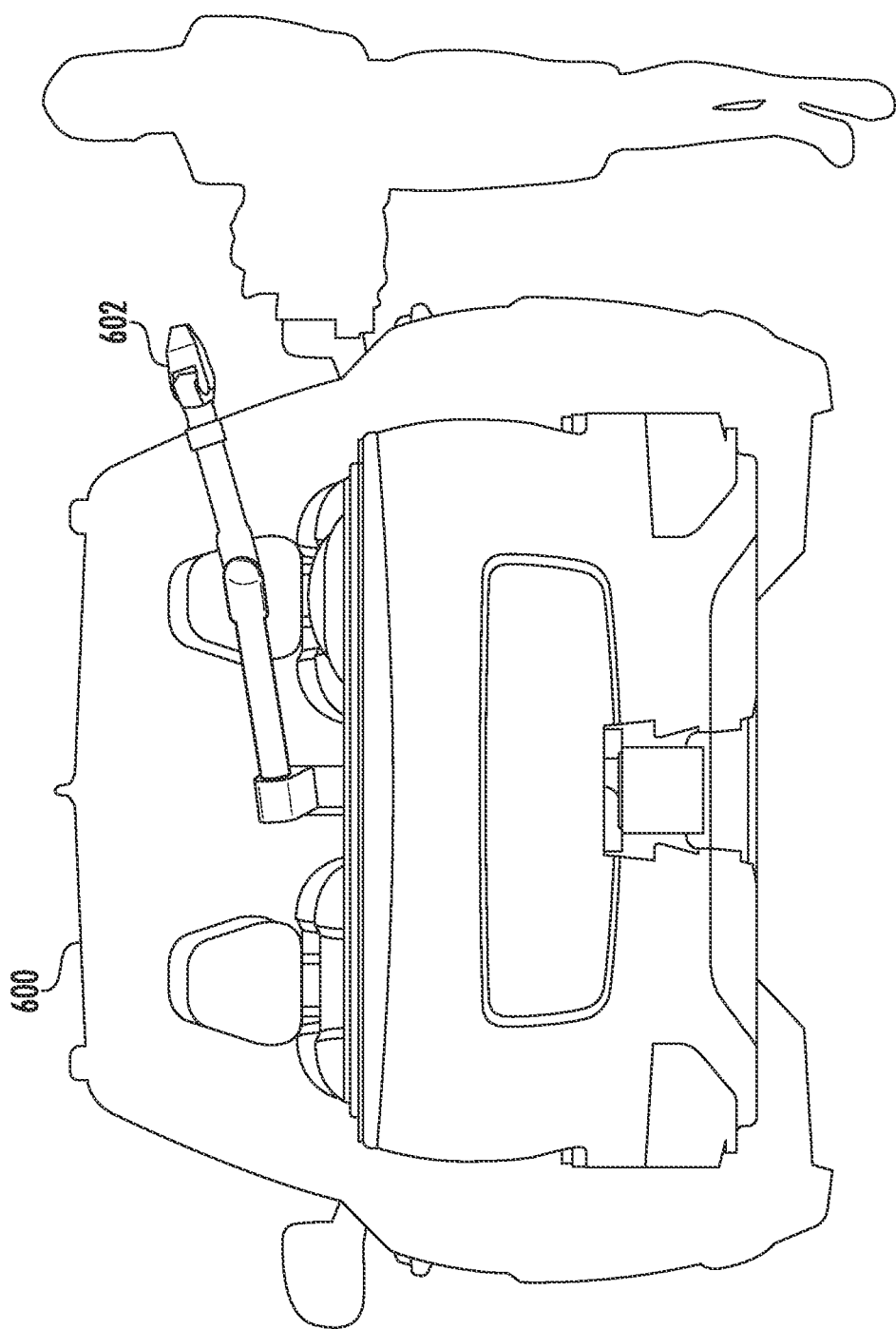
FIG. 6 depicts a robotic manipulator being deployed to remove an object from a vehicle according to example embodiments of the present disclosure.

FIG. 6 depicts a robotic manipulator 602 being deployed in removing an object from a vehicle 600 according to example embodiments of the present disclosure. In some implementations, a robotic manipulator 602 can be configured to collect an object (e.g., using the gripper unit of the robotic manipulator) in the vehicle and deposit the object into a collection receptacle within the vehicle where it can be stored until it can be returned to a user and/or disposed of properly. As illustrated in FIG. 6, the robotic manipulator 602 can be further configured to provide for handling objects within the vehicle and extending outside the vehicle to deliver and/or dispose of the objects as appropriate. For example, the robotic manipulator 602 can provide for handling objects within the vehicle that are to be delivered/returned to a user (e.g., objects to be delivered to a recipient external to the vehicle, collected user objects to be returned to a prior passenger, etc.) and extending the distal end/gripper unit of the robotic manipulator 602 outside the vehicle to allow a recipient external to the vehicle to retrieve the object.

As another example, the automated cleaning system can identify larger debris (e.g., refuse objects) left in the vehicle and deploy the robotic manipulator 602 to collect the refuse object(s) and deposit the refuse object(s) into a collection receptacle within the vehicle configured for the storage of refuse for removal during a vehicle service, for example. In some implementations, the robotic manipulator 602 can be configured to collect the refuse object and extend the distal end/gripper unit of the robotic manipulator 602 outside the vehicle to deposit the refuse object at a location external to the vehicle (e.g., a refuse container at the roadside, a collection point at a service location, etc.).

Figure 7A:
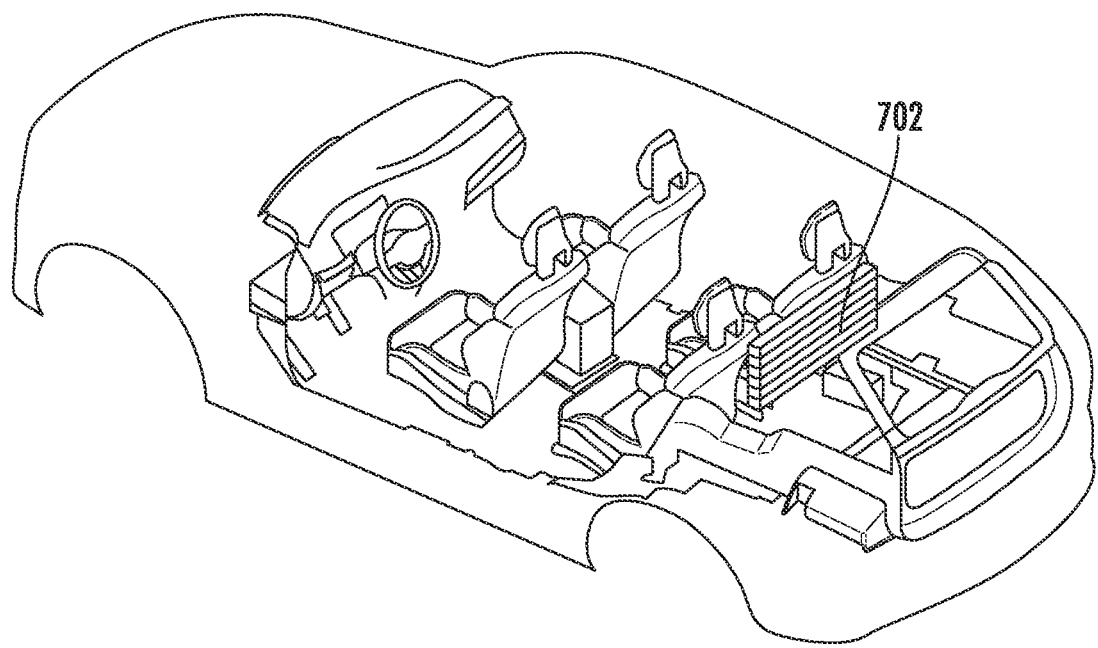
FIG. 7A depicts another example of an automated cleaning system integrated in a vehicle according to example embodiments of the present disclosure.

FIG. 7A depicts another example of an automated cleaning system integrated in a vehicle according to example embodiments of the present disclosure. As illustrated in FIG. 7A, in some implementations, a robotic manipulator 702 of an automated cleaning system can be located and deployed from the rear of a vehicle, such as behind the rear seats of the vehicle, to maximize passenger space with the vehicle. As discussed herein, the robotic manipulator 702 can be configured with a plurality of adjacent arm segments and joints to provide desired degrees of freedom (e.g., five degrees of freedom, seven degrees of freedom, etc.) to allow the robotic manipulator 702 access to all the areas and/or surfaces to be cleaned once deployed from a stowed position in the rear of the vehicle.

Figure 7B:
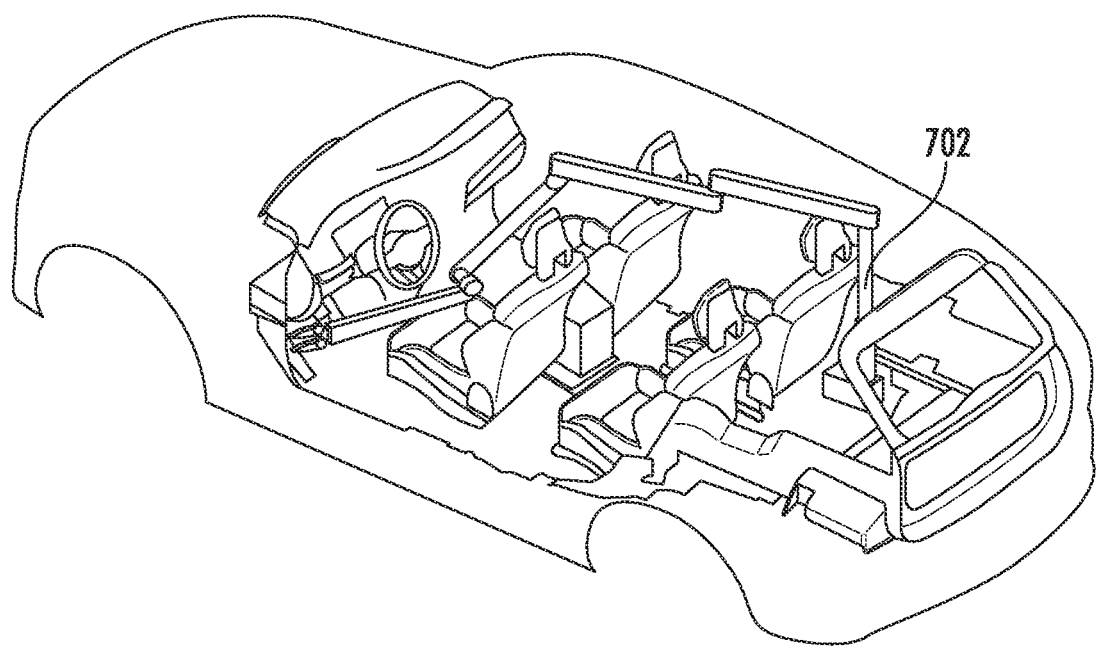
FIG. 7B depicts an example of an automated cleaning system being deployed according to example embodiments of the present disclosure.

FIG. 7B depicts an example of an automated cleaning system being deployed according to example embodiments of the present disclosure. As illustrated in FIG. 7B, the robotic manipulator 702 can be deployed from the rear of the vehicle by extending, rotating, and moving the adjacent arm sections of the robotic manipulator 702 such that the robotic manipulator 702 can access one or more designated areas and/or surfaces to be cleaned within the vehicle.

Figure 8:
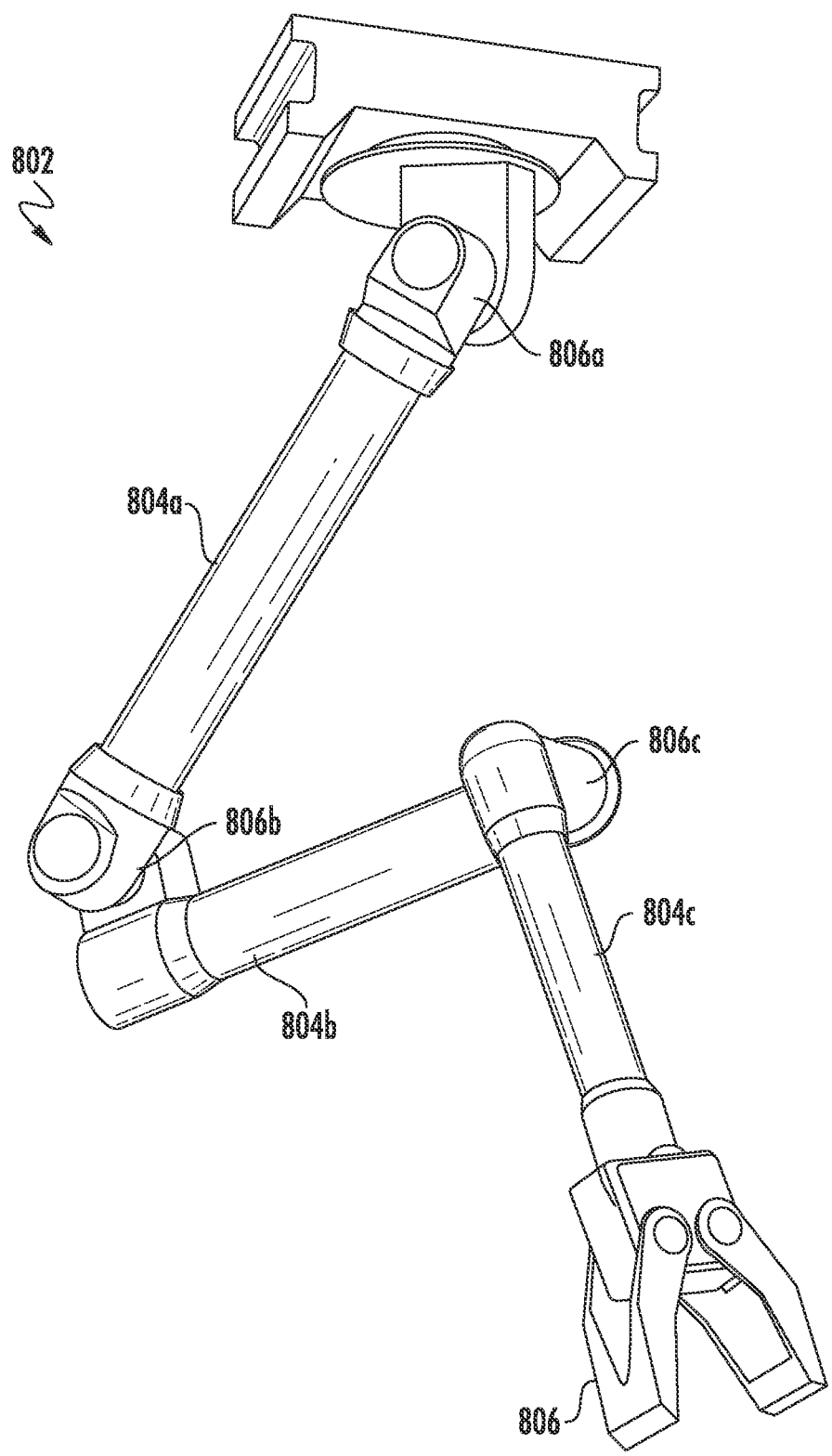
FIG. 8 depicts a robotic manipulator for an automated cleaning system that can be integrated into the rooftop of a vehicle according to example embodiments of the present disclosure.

FIG. 8 depicts a robotic manipulator for an automated cleaning system that can be integrated into the rooftop of a vehicle according to example embodiments of the present disclosure. In some implementations, a robotic manipulator of an automated cleaning system may be configured such that it can be integrated into the rooftop of a vehicle. As illustrated in FIG. 8, a robotic manipulator 802 that can be integrated into the rooftop of a vehicle can comprise multiple adjacent arm segments 804a-804c and rotary joints 806a-806c to allow the robotic manipulator 802 to access all of the surfaces and/or areas within a vehicle interior that may need to be cleaned, for example, after a service trip is completed.

The robotic manipulator 802 further comprises a gripper unit 806 disposed at a distal end of the arm that can be configured to collet user objects, refuse objects, and/or the like, as well as provide a vacuum nozzle for the automated cleaning system. In some implementations, the gripper unit 806 can comprise a first portion and a second portion that can be configured to grasp objects (e.g., refuse objects, user objects left in a vehicle, etc.) and provide for depositing the objects into one of one or more collection receptacles within the vehicle, for example. The gripper unit 806 can provide a vacuum nozzle for the cleaning system to collect small debris. In some implementations, the gripper unit 806 can additionally comprise a sanitizing unit that can provide for sanitizing and/or sterilizing surfaces of the vehicle interior, such as through the use of ultraviolet light. In some implementations, the robotic manipulator 802 can comprise one or more sensors 410 (e.g., camera, etc.), for example associated with the gripper unit, that can be used to assist in inspecting the vehicle interior and identifying objects left behind and/or areas/surfaces that need to be cleaned, used in controlling motion of the robotic manipulator 802 and/or the gripper unit, and/or the like.

Figure 9:
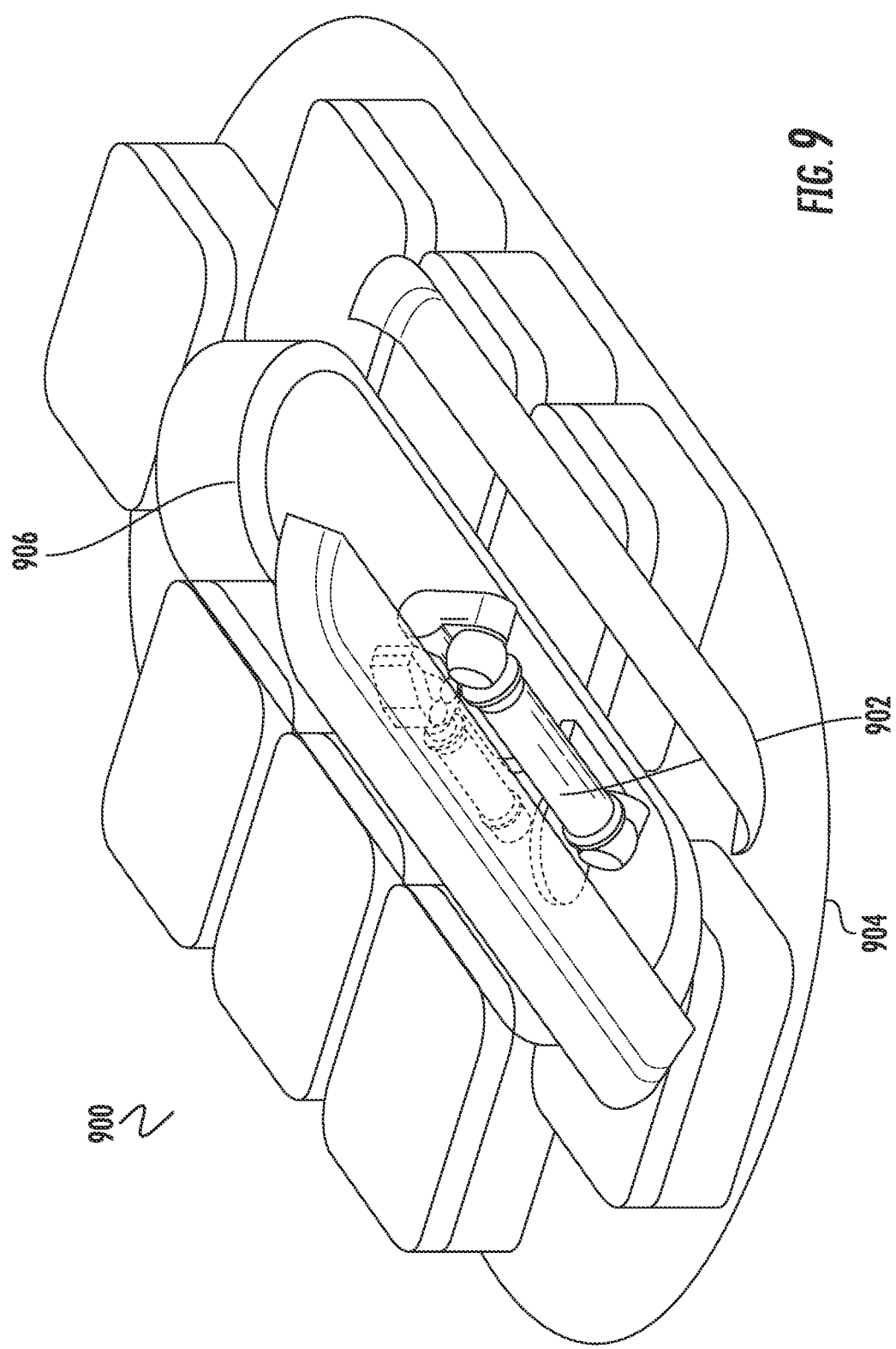
FIG. 9 depicts a rooftop configuration of a robotic manipulator for an automated cleaning system as part of a delivery system according to example embodiments of the present disclosure.

FIG. 9 depicts a rooftop configuration of a robotic manipulator 902 for an automated cleaning system as part of a delivery system 900 according to example embodiments of the present disclosure. In some implementations, a robotic manipulator (e.g., robotic manipulator 902) can be integrated within a central cavity of a rooftop delivery system (e.g., rooftop delivery system 900). As illustrated in FIG. 9, a rooftop delivery system 900 can comprise a carousel-style or looped conveyer 904 including a conveyer belt for handling of delivery packages. The central portion of the conveyer 904/rooftop delivery system 900 can comprise a central cavity 906 configured for the robotic manipulator 902 of an automated cleaning system. The central cavity 906 can provide access to the interior of the vehicle and allow for the robotic manipulator 902 to be deployed from the ceiling of the vehicle interior. The robotic manipulator 902 can be configured to access all of the surfaces and/or areas within a vehicle interior to perform cleaning operations and/or the like, as discussed herein. The central cavity 906 of the rooftop delivery system 900 can be configured such that the central cavity 906 is covered and secured when the robotic manipulator 902 is stowed, such that it is isolated from riders within the vehicle.

Figure 10:
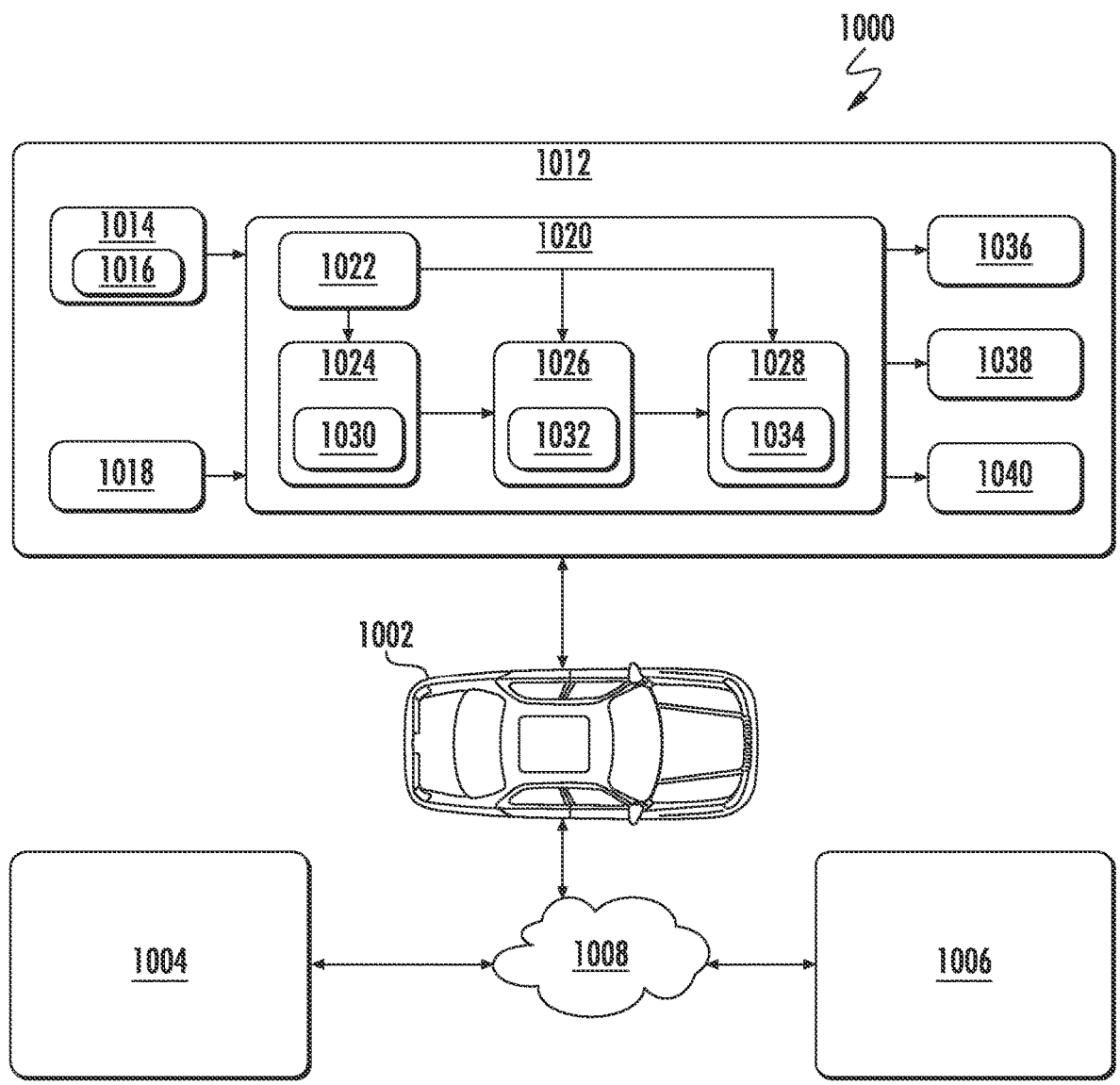
FIG. 10 depicts a block diagram of an example system for controlling the navigation of an autonomous vehicle according to example embodiments of the present disclosure.

FIG. 10 depicts a block diagram of an example system 1000 for controlling the navigation of a vehicle according to example embodiments of the present disclosure. As illustrated, FIG. 10 shows a system 1000 that includes a vehicle 1002; an operations computing system 1004; one or more remote computing devices 1006; a communication network 1008; a vehicle computing system 1012; one or more autonomy system sensors 1014; autonomy system sensor data 1016; a positioning system 1018; an autonomy computing system 1020; map data 1022; a perception system 1024; a prediction system 1026; a motion planning system 1028; state data 1030; prediction data 1032; motion plan data 1034; a communication system 1036; a vehicle control system 1038; and a human-machine interface 1040.

The operations computing system 1004 can be associated with a service provider that can provide one or more vehicle services to a plurality of users via a fleet of vehicles that includes, for example, the vehicle 1002. The vehicle services can include transportation services (e.g., rideshare services), courier services, delivery services, and/or other types of services.

The operations computing system 1004 can include multiple components for performing various operations and functions. For example, the operations computing system 1004 can include and/or otherwise be associated with the one or more computing devices that are remote from the vehicle 1002. The one or more computing devices of the operations computing system 1004 can include one or more processors and one or more memory devices. The one or more memory devices of the operations computing system 1004 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 1004 can be configured to monitor and communicate with the vehicle 1002 and/or its users to coordinate a vehicle service provided by the vehicle 1002. To do so, the operations computing system 1004 can manage a database that includes data including vehicle status data associated with the status of vehicles including the vehicle 1002. The vehicle status data can include a location of a vehicle (e.g., a latitude and longitude of a vehicle), the availability of a vehicle (e.g., whether a vehicle is available to pick-up or drop-off passengers and/or cargo), or the state of objects internal and/or external to a vehicle (e.g., the physical dimensions and/or appearance of objects internal/external to the vehicle).

The operations computing system 1004 can communicate with the one or more remote computing devices 1006 and/or the vehicle 1002 via one or more communications networks including the communications network 1008. The communications network 1008 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 1008 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 1002.

Each of the one or more remote computing devices 1006 can include one or more processors and one or more memory devices. The one or more memory devices can be used to store instructions that when executed by the one or more processors of the one or more remote computing devise 1006 cause the one or more processors to perform operations and/or functions including operations and/or functions associated with the vehicle 1002 including exchanging (e.g., sending and/or receiving) data or signals with the vehicle 1002, monitoring the state of the vehicle 1002, and/or controlling the vehicle 1002. The one or more remote computing devices 1006 can communicate (e.g., exchange data and/or signals) with one or more devices including the operations computing system 1004 and the vehicle 1002 via the communications network 1008. For example, the one or more remote computing devices 1006 can request the location of the vehicle 1002 via the communications network 1008.

The one or more remote computing devices 1006 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 1004). Further, the one or more remote computing devices 1006 can be used to determine and/or modify one or more states of the vehicle 1002 including a location (e.g., a latitude and longitude), a velocity, acceleration, a trajectory, and/or a path of the vehicle 1002 based in part on signals or data exchanged with the vehicle 1002. In some implementations, the operations computing system 1004 can include the one or more remote computing devices 1006.

The vehicle 1002 can be a ground-based vehicle (e.g., an automobile), an aircraft, and/or another type of vehicle. The vehicle 1002 can be an autonomous vehicle that can perform various actions including driving, navigating, and/or operating, with minimal and/or no interaction from a human driver. The autonomous vehicle 1002 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 1002 can provide driving and navigational operation with minimal and/or no interaction from a human driver present in the vehicle. A semi-autonomous operational mode can be one in which the vehicle 1002 can operate with some interaction from a human driver present in the vehicle. Park and/or sleep modes can be used between operational modes while the vehicle 1002 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 1002. Additionally, the vehicle 1002 can provide data indicative of the state of the vehicle, the state of one or more passengers of the vehicle, and/or the state of an environment to the operations computing system 1004, which can store an indication, record, and/or other data indicative of the state of the one or more objects within a predefined distance of the vehicle 1002 in one or more memory devices associated with the operations computing system 1004 (e.g., remote from the vehicle). Furthermore, the vehicle 1002 can provide data indicative of the state of the one or more objects (e.g., physical dimensions and/or appearance of the one or more objects) within a predefined distance of the vehicle 1002 to the operations computing system 1004, which can store an indication, record, and/or other data indicative of the state of the one or more objects within a predefined distance of the vehicle 1002 in one or more memory devices associated with the operations computing system 1004 (e.g., remote from the vehicle).

The vehicle 1002 can include and/or be associated with the vehicle computing system 1012. The vehicle computing system 1012 can include one or more computing devices located onboard the vehicle 1002. For example, the one or more computing devices of the vehicle computing system 1012 can be located on and/or within the vehicle 1002. The one or more computing devices of the vehicle computing system 1012 can include various components for performing various operations and functions. For instance, the one or more computing devices of the vehicle computing system 1012 can include one or more processors and one or more tangible, non-transitory, computer readable media (e.g., memory devices). The one or more tangible, non-transitory, computer readable media can store instructions that when executed by the one or more processors cause the vehicle 1002 (e.g., its computing system, one or more processors, and other devices in the vehicle 1002) to perform operations and functions, including those described herein for determining the interior state of the vehicle 1002, performing cleaning of the vehicle 1002, and/or controlling the vehicle 1002.

As depicted in FIG. 10, the vehicle computing system 1012 can include the one or more autonomy system sensors 1014; the positioning system 1018; the autonomy computing system 1020; the communication system 1036; the vehicle control system 1038; and the human-machine interface 1040. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 1014 can be configured to generate and/or store data including the autonomy sensor data 1016 associated with one or more objects that are proximate to the vehicle 1002 (e.g., within range or a field of view of one or more of the one or more sensors 1014). The one or more autonomy system sensors 1014 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 1016 can include image data, radar data, LIDAR data, and/or other data acquired by the one or more autonomy system sensors 1014. The one or more objects can include, for example, pedestrians, vehicles, bicycles, and/or other objects. The one or more objects can be located on various parts of the vehicle 1002 including a front side, rear side, left side, right side, top, or bottom of the vehicle 1002. The autonomy sensor data 1016 can be indicative of locations associated with the one or more objects within the surrounding environment of the vehicle 1002 at one or more times. For example, autonomy sensor data 1016 can be indicative of one or more LIDAR point clouds associated with the one or more objects within the surrounding environment. The one or more autonomy system sensors 1014 can provide the autonomy sensor data 1016 to the autonomy computing system 1020.

In addition to the autonomy sensor data 1016, the autonomy computing system 1020 can retrieve or otherwise obtain data including the map data 1022. The map data 1022 can provide detailed information about the surrounding environment of the vehicle 1002. For example, the map data 1022 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or boundary markings associated therewith); traffic control data (e.g., the location and instructions of signage, traffic lights, or other traffic control devices); and/or any other map data that provides information that assists the vehicle computing system 1012 in processing, analyzing, and perceiving its surrounding environment and its relationship thereto.

The vehicle computing system 1012 can include a positioning system 1018. The positioning system 1018 can determine a current position of the vehicle 1002. The positioning system 1018 can be any device or circuitry for analyzing the position of the vehicle 1002. For example, the positioning system 1018 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 1002 can be used by various systems of the vehicle computing system 1012 and/or provided to one or more remote computing devices (e.g., the operations computing system 1004 and/or the remote computing device 1006). For example, the map data 1022 can provide the vehicle 1002 relative positions of the surrounding environment of the vehicle 1002. The vehicle 1002 can identify its position within the surrounding environment (e.g., across six axes) based at least in part on the data described herein. For example, the vehicle 1002 can process the autonomy sensor data 1016 (e.g., LIDAR data, camera data) to match it to a map of the surrounding environment to get an understanding of the vehicle's position within that environment (e.g., transpose the vehicle's position within its surrounding environment).

The autonomy computing system 1020 can include a perception system 1024, a prediction system 1026, a motion planning system 1028, and/or other systems that cooperate to perceive the surrounding environment of the vehicle 1002 and determine a motion plan for controlling the motion of the vehicle 1002 accordingly. For example, the autonomy computing system 1020 can receive the autonomy sensor data 1016 from the one or more autonomy system sensors 1014, attempt to determine the state of the surrounding environment by performing various processing techniques on the autonomy sensor data 1016 (and/or other data), and generate an appropriate motion plan through the surrounding environment. The autonomy computing system 1020 can control the one or more vehicle control systems 1038 to operate the vehicle 1002 according to the motion plan.

The perception system 1024 can identify one or more objects that are proximate to the vehicle 1002 based on autonomy sensor data 1016 received from the autonomy system sensors 1014. In particular, in some implementations, the perception system 1024 can determine, for each object, state data 1030 that describes a current state of such object. As examples, the state data 1030 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 1024 can determine state data 1030 for each object over a number of iterations. In particular, the perception system 1024 can update the state data 1030 for each object at each iteration. Thus, the perception system 1024 can detect and track objects (e.g., vehicles, bicycles, pedestrians, etc.) that are proximate to the vehicle 1002 over time, and thereby produce a presentation of the world around an vehicle 1002 along with its state (e.g., a presentation of the objects of interest within a scene at the current time along with the states of the objects).

The prediction system 1026 can receive the state data 1030 from the perception system 1024 and predict one or more future locations and/or moving paths for each object based on such state data. For example, the prediction system 1026 can generate prediction data 1032 associated with each of the respective one or more objects proximate to the vehicle 1002. The prediction data 1032 can be indicative of one or more predicted future locations of each respective object. The prediction data 1032 can be indicative of a predicted path (e.g., predicted trajectory) of at least one object within the surrounding environment of the vehicle 1002. For example, the predicted path (e.g., trajectory) can indicate a path along which the respective object is predicted to travel over time (and/or the velocity at which the object is predicted to travel along the predicted path). The prediction system 1026 can provide the prediction data 1032 associated with the one or more objects to the motion planning system 1028.

The motion planning system 1028 can determine a motion plan and generate motion plan data 1034 for the vehicle 1002 based at least in part on the prediction data 1032 (and/or other data). The motion plan data 1034 can include vehicle actions with respect to the objects proximate to the vehicle 1002 as well as the predicted movements. For instance, the motion planning system 1028 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 1034. By way of example, the motion planning system 1028 can determine that the vehicle 1002 can perform a certain action (e.g., pass an object) without increasing the potential risk to the vehicle 1002 and/or violating any traffic laws (e.g., speed limits, lane boundaries, signage). The motion plan data 1034 can include a planned trajectory, velocity, acceleration, and/or other actions of the vehicle 1002.

As one example, in some implementations, the motion planning system 1028 can determine a cost function for each of one or more candidate motion plans for the autonomous vehicle 1002 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 1002 approaches impact with another object and/or deviates from a preferred pathway (e.g., a predetermined travel route).

Thus, given information about the current locations and/or predicted future locations and/or moving paths of objects, the motion planning system 1028 can determine a cost of adhering to a particular candidate pathway. The motion planning system 1028 can select or determine a motion plan for the autonomous vehicle 1002 based at least in part on the cost function(s). For example, the motion plan that minimizes the cost function can be selected or otherwise determined. The motion planning system 1028 then can provide the selected motion plan to a vehicle controller that controls one or more vehicle controls (e.g., actuators or other devices that control gas flow, steering, braking, etc.) to execute the selected motion plan.

The motion planning system 1028 can provide the motion plan data 1034 with data indicative of the vehicle actions, a planned trajectory, and/or other operating parameters to the vehicle control systems 1038 to implement the motion plan data 1034 for the vehicle 1002. For instance, the vehicle 1002 can include a mobility controller configured to translate the motion plan data 1034 into instructions. By way of example, the mobility controller can translate a determined motion plan data 1034 into instructions for controlling the vehicle 1002 including adjusting the steering of the vehicle 1002 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 1034.

The vehicle computing system 1012 can include a communications system 1036 configured to allow the vehicle computing system 1012 (and its one or more computing devices) to communicate with other computing devices. The vehicle computing system 1012 can use the communications system 1036 to communicate with the operations computing system 1004 and/or one or more other remote computing devices (e.g., the one or more remote computing devices 1006) over one or more networks (e.g., via one or more wireless signal connections, etc.). In some implementations, the communications system 1036 can allow communication among one or more of the system on-board the vehicle 1002. The communications system 1036 can also be configured to enable the autonomous vehicle to communicate with and/or provide and/or receive data and/or signals from a remote computing device 1006 associated with a user and/or an item (e.g., an item to be picked-up for a courier service). The communications system 1036 can utilize various communication technologies including, for example, radio frequency signaling and/or Bluetooth low energy protocol. The communications system 1036 can include any suitable components for interfacing with one or more networks, including, for example, one or more: transmitters, receivers, ports, controllers, antennas, and/or other suitable components that can help facilitate communication. In some implementations, the communications system 1036 can include a plurality of components (e.g., antennas, transmitters, and/or receivers) that allow it to implement and utilize multiple-input, multiple-output (MIMO) technology and communication techniques.

The vehicle computing system 1012 can include the one or more human-machine interfaces 1040. For example, the vehicle computing system 1012 can include one or more display devices located on the vehicle computing system 1012. A display device (e.g., screen of a tablet, laptop, and/or smartphone) can be viewable by a user of the vehicle 1002 that is located in the front of the vehicle 1002 (e.g., driver's seat, front passenger seat). Additionally, or alternatively, a display device can be viewable by a user of the vehicle 1002 that is located in the rear of the vehicle 1002 (e.g., a back passenger seat).

FIG. 11 depicts a block diagram of an example computing system 1100 according to example embodiments of the present disclosure. The example system 1100 illustrated in FIG. 11 is provided as an example only. The components, systems, connections, and/or other aspects illustrated in FIG. 11 are optional and are provided as examples of what is possible, but not required, to implement the present disclosure. The example system 1100 can include the vehicle computing system 1012 of the autonomous vehicle 1002 and a remote computing system 1120 (e.g., operations computing system, other computing system, etc. that is remote from the vehicle 1002) that can be communicatively coupled to one another over one or more network(s) 1140. The remote computing system 1120 can be and/or include the operations computing system 1004 and/or remote computing system 1006 of FIG. 10. The remote computing system 1120 can be associated with a central operations system and/or an entity associated with the vehicle 1002 such as, for example, a vehicle owner, vehicle manager, fleet operator, service provider, etc. For instance, the remote computing system 1120 can be or otherwise include the remote computing system 1004 described herein.

The computing device(s) 1101 of the vehicle computing system 1012 can include processor(s) 1102 and at least one memory 1104. The one or more processors 1102 can be any suitable processing device (e.g., a processor core, a microprocessor, an ASIC, a FPGA, a controller, a microcontroller, etc.) and can be one processor or a plurality of processors that are operatively connected. The memory 1104 can include one or more non-transitory computer-readable storage media, such as RAM, ROM, EEPROM, EPROM, one or more memory devices, flash memory devices, magnetic disks, data registers, etc., and combinations thereof.

The memory 1104 can store information that can be accessed by the one or more processors 1102. For instance, the memory 1104 (e.g., one or more non-transitory computer-readable storage mediums, memory devices) can include computer-readable instructions 1106 that can be executed by the one or more processors 1102. The instructions 1106 can be software written in any suitable programming language or can be implemented in hardware. Additionally, or alternatively, the instructions 1106 can be executed in logically and/or virtually separate threads on processor(s) 1102.

For example, the memory 1104 on-board the vehicle 1002 can store instructions 1106 that when executed by the one or more processors 1102 cause the one or more processors 1102 (e.g., in the vehicle computing system 1012) to perform operations such as any of the operations and functions of the computing device(s) 1101 and/or vehicle computing system 1012, any of the operations and functions for which the vehicle computing system 1012 is configured, and/or any other operations and functions described herein.

The memory 1104 can store data 1108 that can be obtained (e.g., received, accessed, written, manipulated, created, generated, etc.) and/or stored. The data 1108 can include, for instance, services data (e.g., trip data, user data, etc.), sensor data, map data, perception data, prediction data, motion planning data, object states and/or state data, object motion trajectories, feedback data, fault data, log data, and/or other data/information as described herein. In some implementations, the computing device(s) 1101 can obtain data from one or more memories that are remote from the autonomous vehicle 1002.

The computing device(s) 1101 can also include a communication interface 1110 used to communicate with one or more other system(s) (e.g., the remote computing system 1120). The communication interface 1110 can include any circuits, components, software, etc. for communicating via one or more networks (e.g., network(s) 1140). In some implementations, the communication interface 1110 can include, for example, one or more of a communications controller, receiver, transceiver, transmitter, port, conductors, software, and/or hardware for communicating data.

The remote computing system 1120 can include one or more computing device(s) 1121. The computing device(s) 1121 can include one or more processors 1122 and at least one memory 1124. The one or more processors 1122 can be any suitable processing device (e.g., a processor core, a microprocessor, an ASIC, a FPGA, a controller, a microcontroller, etc.) and can be one processor or a plurality of processors that are operatively connected. The memory 1124 can include one or more tangible, non-transitory computer-readable storage media, such as RAM, ROM, EEPROM, EPROM, one or more memory devices, flash memory devices, data registers, etc., and combinations thereof.

The memory 1124 can store information that can be accessed by the one or more processors 1122. For instance, the memory 1124 (e.g., one or more tangible, non-transitory computer-readable storage media, one or more memory devices, etc.) can include computer-readable instructions 1126 that can be executed by the one or more processors 1122. The instructions 1126 can be software written in any suitable programming language or can be implemented in hardware. Additionally, or alternatively, the instructions 1126 can be executed in logically and/or virtually separate threads on processor(s) 1122.

For example, the memory 1124 can store instructions 1126 that when executed by the one or more processors 1122 cause the one or more processors 1122 to perform operations such as any of the operations and functions of the operations computing system 1004, the remote computing system 1006, the remote computing system 1120 and/or computing device(s) 1121 or for which any of these computing systems are configured, as described herein, and/or any other operations and functions described herein.

The memory 1124 can store data 1128 that can be obtained and/or stored. The data 1128 can include, for instance, services data (e.g., trip data, user, data etc.), data associated with autonomous vehicles (e.g., vehicle data, maintenance data, ownership data, sensor data, map data, perception data, prediction data, motion planning data, object states and/or state data, object motion trajectories, feedback data, fault data, log data, etc.), inventory data, scheduling data, log data, attribute data, scenario data, training data, and/or other data/information as described herein. In some implementations, the computing device(s) 1121 can obtain data from one or more memories that are remote from the remote computing system 1120.

The computing device(s) 1121 can also include a communication interface 1130 used to communicate with one or more other system(s) (e.g., the vehicle computing system 1012, etc.). The communication interface 1130 can include any circuits, components, software, etc. for communicating via one or more networks (e.g., network(s) 1140). In some implementations, the communication interface 1130 can include, for example, one or more of a communications controller, receiver, transceiver, transmitter, port, conductors, software, and/or hardware for communicating data.

The network(s) 1140 can be any type of network or combination of networks that allows for communication between devices. In some embodiments, the network(s) 1140 can include one or more of a local area network, wide area network, the Internet, secure network, cellular network, mesh network, peer-to-peer communication link, and/or some combination thereof, and can include any number of wired or wireless links. Communication over the network(s) 1140 can be accomplished, for instance, via a communication interface using any type of protocol, protection scheme, encoding, format, packaging, etc.

Figure 12:
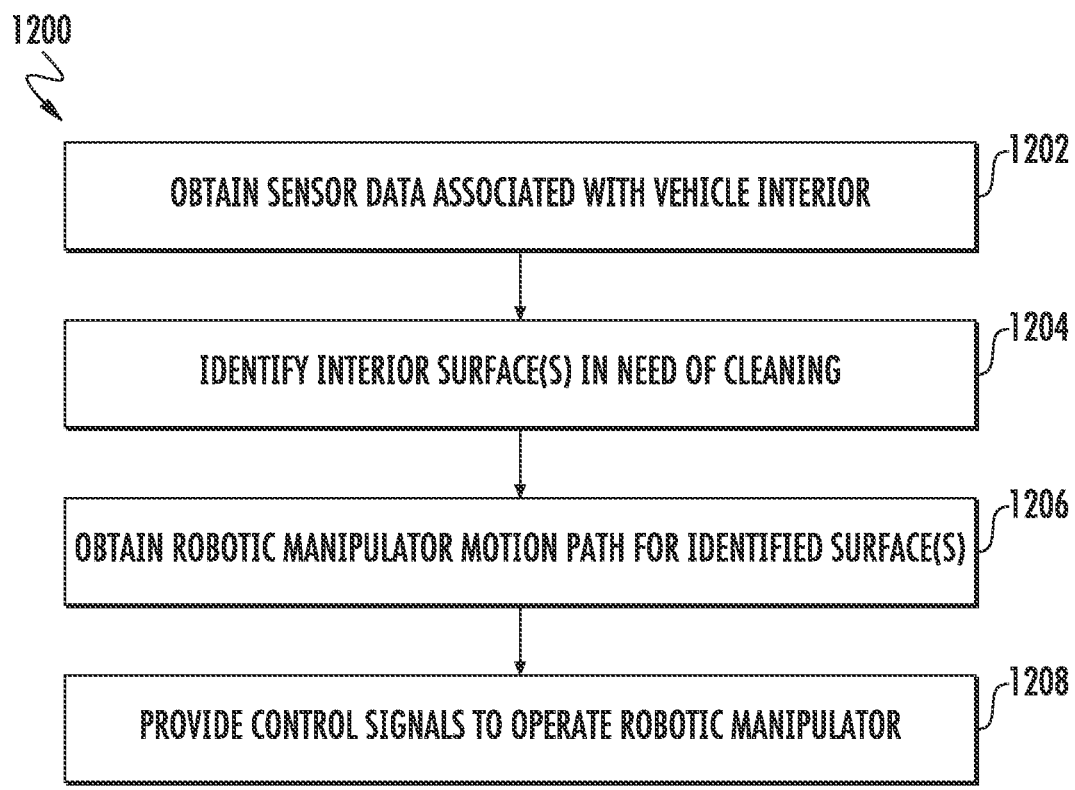
FIG. 12 depicts a flowchart diagram of example operations for a vehicle cleaning according to example embodiments of the present disclosure.

FIG. 12 depicts a flow diagram of example operations for method 1200 for interior vehicle cleaning according to example embodiments of the present disclosure. As described herein, in some implementations, an automated vehicle cleaning system can be integrated into a vehicle, such as an autonomous vehicle, to provide for cleaning the vehicle after each service trip, thereby ensuring that each user is presented with a vehicle interior that meets a desired standard for cleanliness. One or more portion(s) of the method 1200 can be implemented by one or more computing devices such as, for example, the vehicle computing system 1012 of FIG. 10, the operations computing system 1004 of FIG. 10, the remote computing system 1006 of FIG. 10, the computing system 1012 of FIG. 11, the computing system 1120 of FIG. 11, and/or the like. Each respective portion of the method 1200 can be performed by any (or any combination) of the one or more computing devices. Moreover, one or more portion(s) of the method 1200 can be implemented as an algorithm on the hardware components of the device(s) described herein (e.g., as in FIGS. 10 and 11), for example, to provide for automated vehicle cleaning as described herein. FIG. 12 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1202, the method 1200 can include one or more computing devices included within a computing system (e.g., computing system 1012, 1004, 1120, and/or the like) obtaining sensor data associated with the interior of a vehicle.

At 1204, the computing system can identify one or more interior surfaces and/or areas that may need to be cleaned and/or have objects removed. For example, the computing system can use the sensor data to facilitate determining when a vehicle interior deviates from an established standard or when objects have been left behind in the vehicle, for instance, upon the completion of a service trip. In some implementations, an automated cleaning system integrated into the vehicle that can inspect the interior and take any necessary or desired actions to maintain the cleanliness of the vehicle interior after each service trip. For example, based on identifying one or more surfaces and/or areas that need to be cleaned, the computing system can provide for control of the automated cleaning system to allow for collection of objects, cleaning and/or sanitizing of interior surfaces and/or areas of the vehicle, for example, through the use of a robotic manipulator associated with the cleaning system and integrated within the interior of the vehicle.

At 1206, the computing system can obtain one or more motion paths for a robotic manipulator to access and perform cleaning of the identified surface(s)/area(s). For example, the automated cleaning system can operate in a largely autonomous mode, such as by performing preset cleaning routines within fixed areas of the vehicle interior. In some implementations, the computing system can obtain defined motion path(s) for identified areas within the vehicle that allow for performing the cleaning of the identified area(s).

At 1208, the computing system can generate and provide one or more control signals to implement an appropriate motion path for the robotic manipulator of the cleaning system to access the designated area and operate the robotic manipulator to perform the necessary actions to clean and/or collect objects from the identified area(s, as described herein.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for controlling a robotic manipulator for interior vehicle cleaning, the method comprising:
    obtaining sensor data associated with an interior of a vehicle;
    identifying one or more objects that have been left by a passenger within the interior of the vehicle based on the sensor data;
    in response to identifying the one or more objects, providing one or more control signals to operate the robotic manipulator for a vehicle cleaning system to retrieve the one or more objects, wherein the vehicle cleaning system is integrated within the vehicle,
    the robotic manipulator comprising: (i) an arm including one or more arm sections and (ii) a gripper unit positioned at a distal end of the arm; and
    using the robotic manipulator to retrieve the one or more objects based on the one or more control signals.

2. The computer-implemented method of claim 1, further comprising:
    determining that a service trip has been completed by the vehicle.

3. The computer-implemented method of claim 2, wherein determining that the service trip has been completed by the vehicle comprises determining that the service trip has been completed based on the passenger exiting the vehicle.

4. The computer-implemented method of claim 1, wherein identifying the one or more objects comprises identifying the one or more objects during a cleaning routine of the vehicle cleaning system.

5. The computer-implemented method of claim 1, wherein the one or more control signals cause the robotic manipulator to implement a motion path to access one or more areas within the interior of the vehicle, wherein the control signals further comprise instructions that cause the robotic manipulator to perform actions to collect the one or more objects from the one or more areas.

6. The computer-implemented method of claim 1, wherein the robotic manipulator is further configured to manipulate components of the vehicle comprising at least one of compartments or doors.

7. The computer-implemented method of claim 1, further comprising:
identifying an object type for at least one object of the one or more Objects.

8. The computer-implemented method of claim 7, wherein the object type comprises at least one of: (i) a user object or (ii) a refuse object.

9. The computer-implemented method of claim 7, wherein the at least one object of the one or more objects is a refuse object, and wherein the robotic manipulator is configured to extend the gripper unit of the robotic manipulator outside the vehicle to deposit the refuse object at a location external to the vehicle.

10. The computer-implemented method of claim 1, wherein the robotic manipulator is configured to deliver an object to a recipient located outside of the vehicle.

11. The computer-implemented method of claim 1, wherein the vehicle cleaning system is configured to deposit the one or more objects into one or more receptacles with the vehicle.

12. A vehicle comprising:
a passenger cabin; and
a vehicle cleaning system integrated within the vehicle, the vehicle cleaning system comprising a robotic manipulator,
the robotic manipulator comprising an arm including one or more arm sections, and a gripper unit positioned at distal end of the arm,
the vehicle cleaning system being configured to retrieve one or more objects that have been identified within the passenger cabin.

13. The vehicle of claim 12, wherein the robotic manipulator further comprises one or more sensors.

14. The vehicle of claim 13, wherein the one or more sensors comprises one or more cameras.

15. The vehicle of claim 12, wherein robotic manipulator is stowable within the vehicle.

16. The vehicle of claim 12, further comprising one or more receptacles.

17. The vehicle of claim 16, wherein the one or more receptables comprise one or more first receptacles for objects associated with passengers and one or more second receptacles for refuse objects.

18. A vehicle cleaning system comprising:
a robotic manipulator comprising:
(i) an arm including one or more arm sections and
(ii) a gripper unit positioned at a distal end of the arm; and
a computing system comprising:
one or more processors; and
one or more non-transitory computer-readable media that store instructions that are executable by the one or more processors to perform operations comprising:
obtaining sensor data associated with an interior of a vehicle;
identifying one or more objects that have been left within the interior of the vehicle based on the sensor data;
in response to identifying the one or more objects, providing data indicating that the robotic manipulator of the vehicle cleaning system integrated with the vehicle is to retrieve the one or more objects;
the robotic manipulator being configured to retrieve the one or more objects based on the data indicating that the robotic manipulator is to retrieve the one or more objects.

19. The computing system of claim 18, wherein the operations further comprise:
determining that a vehicle service has been completed by the vehicle.

20. The computing system of claim 19, wherein the vehicle service comprises a delivery service.

* * * * *